United States Patent [19]

Yoshihiro

[11] Patent Number: 4,791,498
[45] Date of Patent: Dec. 13, 1988

[54] TIME BASE CORRECTOR

[75] Inventor: Mitsugu Yoshihiro, Kanagawa, Japan

[73] Assignee: Sony Corporation, Tokyo, Japan

[21] Appl. No.: 30,473

[22] Filed: Mar. 26, 1987

[30] Foreign Application Priority Data

Apr. 11, 1986 [JP] Japan .................................. 61-83751

[51] Int. Cl.⁴ ............................................. H04N 5/95
[52] U.S. Cl. .................................. 360/36.2; 358/339;
358/35
[58] Field of Search ............... 360/36.1, 36.2; 358/35,
358/324, 320, 337, 339

[56] References Cited

U.S. PATENT DOCUMENTS

| 4,214,262 | 7/1980 | Mizukami | 358/339 |
|---|---|---|---|
| 4,373,168 | 2/1983 | Mizukami | 358/339 |
| 4,393,418 | 7/1983 | Kimura | 360/36.1 |
| 4,438,456 | 3/1984 | Yoshinaka | 358/320 |
| 4,613,827 | 9/1986 | Takamori | 360/36.1 |
| 4,668,998 | 5/1987 | Aoki | 360/36.1 |
| 4,680,658 | 7/1987 | Tatami | 360/36.2 |
| 4,688,111 | 8/1987 | Kani | 360/36.2 |
| 4,714,965 | 12/1987 | Yoshinaka | 358/320 |
| 4,733,311 | 3/1988 | Yoshinaka | 360/36.1 |
| 4,733,312 | 3/1988 | Morimoto | 360/36.1 |

FOREIGN PATENT DOCUMENTS 0143017  11/1979  Japan .................................. 360/36.2

OTHER PUBLICATIONS

Acker & McLean, Digital Time-Base Correction for Video Signal Processing, Mar. 1976, pp. 146-150; SMPTE Journal.

Hedlund, The TR-800VTR, Mar. 1981, pp. 18-26, International Broadcast Engineer.

Primary Examiner—Alan Faber
Attorney, Agent, or Firm—Curtis, Morris & Safford

[57] ABSTRACT

A time base corrector for correcting time base fluctuations in a video signal is effective to remove both low frequency time base fluctuations and repetitive high frequency time base fluctuations repeating at the field period of the video signal. The time base corrector includes a memory having a plurality of addresses for storing residual phase error data corresponding to iundividual horizontal lines of each field period. A control circuit supplies corresponding residual phase error data from the memory to be used in compensating a present phase error signal whereby the high frequency time base fluctuations may be removed, and further mixes the present phase error signal with corresponding residual phase error data to generate new residual phase error data for storage in the memory in place of the original residual phase error data.

16 Claims, 4 Drawing Sheets

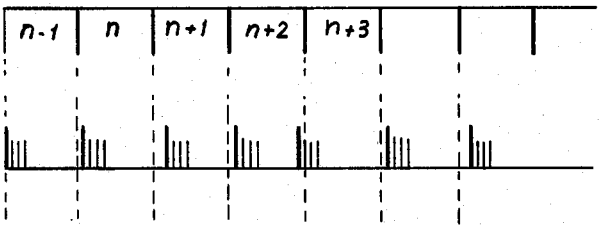
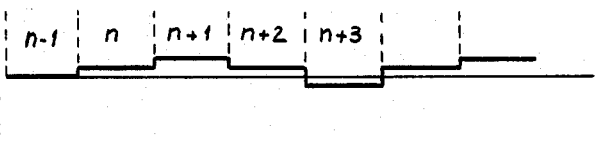
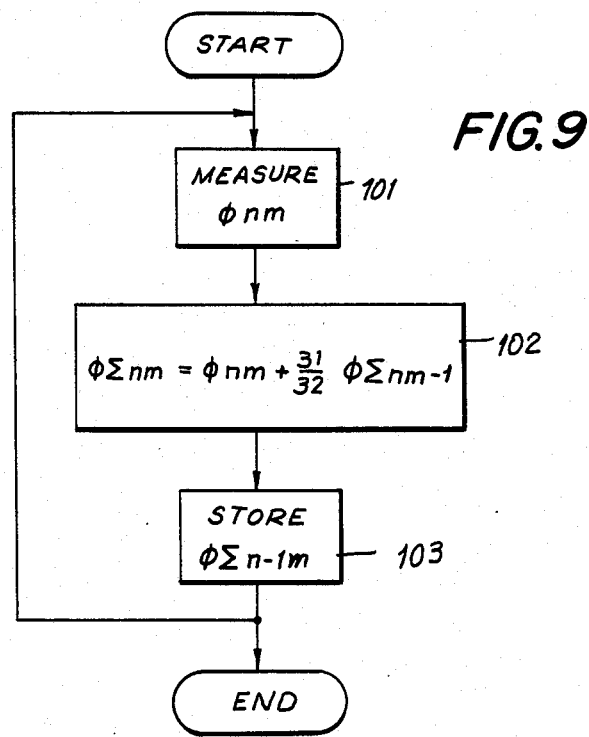
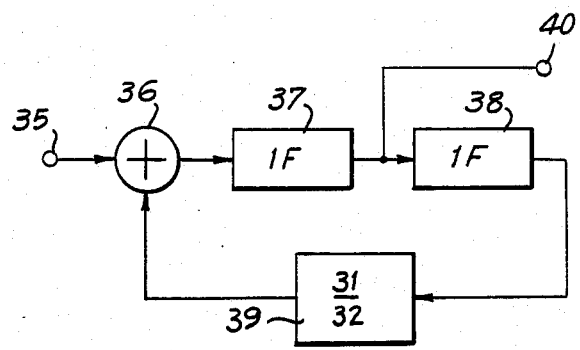

TIME BASE CORRECTOR

FIELD OF THE INVENTION

The present invention relates to a time base corrector for correcting time base fluctuations in a reproduced video signal.

BACKGROUND OF THE INVENTION

When a video signal is recorded on and then reproduced from a recording medium such as a magnetic tape, the reproduced video signal may include time base errors or fluctuations reflecting minute changes in the speed at which the video signal is reproduced. For example, through age or wear on the magnetic tape, portions of the magnetic tape may be slightly stretched or contracted, with the result that a video signal reproduced from the stretched portion takes slightly longer per horizontal line for reproduction, while a video signal reproduced from a contracted portion takes slightly less time. Other sources of time base errors include the improper functioning of the reproducing apparatus or the inherent effects of normal operation. However, the proper display of the reproduced video signal depends crucially on the vertical and horizontal synchronizing signals occurring with precisely the correct intervals therebetween, since the visible result of irregular timing is to displace what would otherwise be displayed as a purely vertical line into a line with oscillations or rapid horizontal displacements and slower decays and so time base fluctuations such as those described above, if left uncorrected, present a serious problem.

Therefore, to remove such time base fluctuations, it is known to include a time base corrector in the reproducing apparatus which reads the reproduced video signal into a memory at a variable rate reflecting the time base fluctuations included in the reproduced video signal and to read out the stored video signal at a constant rate without the time base fluctuations. Such time base correctors generally include a phase locked loop control circuit responsive to the synchronizing signals in the reproduced video signal for producing a high frequency write clock signal which includes the time base fluctuations of the reproduced video signal. The phase locked loop control circuit conventionally includes a voltage controlled oscillator producing the output high frequency signal, a frequency divider for dividing the output signal, a phase comparator which compares the phases of the frequency divided output signal and the horizontal synchronizing signals from the reproduced video signal and a low pass filter for filtering the output of the phase comparator to provide a control voltage for the oscillator. Since the output of the oscillator is controlled to reflect the varying frequency of the successive horizontal synchronizing signals, it can be the basis for the write clock signal to control time base correction. Thus, the reproduced video signal is read into the memory at times determined by the write clock signal. A corresponding read clock signal is generated from an oscillator having a known frequency and the stored video signal is read out in response thereto.

However, the use of the low pass filter to provide the control voltage inherently filters out any high frequency components of the time base fluctuations, and so this known time base corrector does not correct for such high frequency fluctuations. The reproduced video signal frequently includes both random and periodic high frequency time base fluctuations and it is known in the prior art to provide a velocity error corrector which modifies the read clock signal so as to remove both types of high frequency fluctuations. However, such velocity error correctors are generally complex, difficult to install and expensive and are disadvantageous for use in a mass produced item such as a video tape recorder. Consequently, many video tape recorders do not contain a velocity error corrector and so do not compensate for high frequency fluctuations.

OBJECTS AND SUMMARY OF THE INVENTION

It is an object of the present invention to provide a time base corrector and method for correcting time base fluctuations which avoid the above-described difficulties of the prior art.

It is another object of the present invention to provide a time base corrector and method which remove repetitive or periodic high frequency time base fluctuations from a reproduced video signal.

It is yet another object of the present invention to provide a time base corrector which achieves the above objects and is relatively simple in construction and inexpensive.

In accordance with an aspect of the present invention, a time base corrector for correcting time base fluctuations in a video signal containing a horizontal synchronizing signal and being reproduced from a recording medium comprising a write clock generator for generating a write clock signal having the time base fluctuations in the reproduced video signal, a memory unit for storing the reproduced video signal in response to the write clock signal, and a read clock generator for generating a read clock signal supplied to the memory unit to read the stored reproduced video signal from the memory unit, characterized in that the write clock generator comprises voltage controlled oscillator means for generating an oscillating output signal, frequency divider means for frequency dividing the oscillating output signal to provide a frequency divided output, phase comparator means for comparing phases of the frequency divided output and the horizontal synchronizing signal of the reproduced video signal to provide a comparison output, low pass filter means for filtering the comparison output to provide a filtered output, analog-to-digital converter means for converting the comparison output to converted digital data, memory means having a plurality of addresses for storing residual phase error data, control means supplied with the converted digital data for mixing, in a predetermined ratio, the converted digital data and corresponding residual phase error data read from a selected one of the addresses in the memory means to generate new residual phase error data and to store the new residual phase error data at the selected address, digital-to-analog converter means for converting the residual error data read out from the selected address in the memory means to an analog control voltage, and adder means for adding together the filtered output of the low pass filter means and the analog control voltage to form a voltage control signal for controlling the voltage controlled oscillator means.

In accordance with a further aspect of the present invention, the time base corrector is further characterized in that each of the plurality of addresses of the memory means corresponds to a respective line within a frame of the reproduced video signal and the control means selects an address corresponding to one respective line during the occurrence of the line preceding that one line.

The above, and other objects, features and advantages of the present invention, will become apparent from the following detailed description of the preferred embodiment taken in conjunction with the accompanying drawings, throughout which like reference numerals designate like elements and parts.

BRIEF DESCRIPTION OF THE DRAWINGS

FIGS. 8A-8C are timing diagrams to which reference will be made in explaining the generation of the time base corrector of FIG. 6;

FIG. 9 is a flowchart of an operation performed in the time base corrector of FIG. 6; and FIG. 10 is a block diagram of an equivalent circuit of a portion of the time base corrector of FIG. 6.

DETAILED DESCRIPTION OF THE PREFERRED EMBODIMENT

Figure 1:
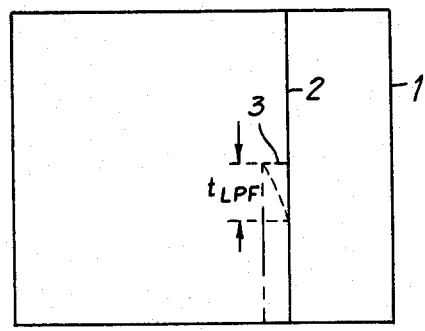
FIG. 1 is a schematic diagram of a television screen illustrating the effect of a time base fluctuation on a displayed image.

Referring now to the drawings and initially to FIG. 1 thereof, it will be seen that a video image produced on a television is there shown to include a straight vertical line 2. If, in the middle of a field period, a horizontal synchronizing pulse is delayed for any reason, such as, by stretching of a magnetic tape from which the video signal is reproduced, the position of line 2 in the next and successive horizontal line periods will be shifted to the left by a small amount 3 corresponding to the delay. The purpose of a time base corrector is to compensate for the irregularity in the period of the horizontal synchronizing signal H formed of successive horizontal synchronizing pulses so as to restore the horizontal synchronizing signal and the resultant display to their normal conditions.

Figure 2:
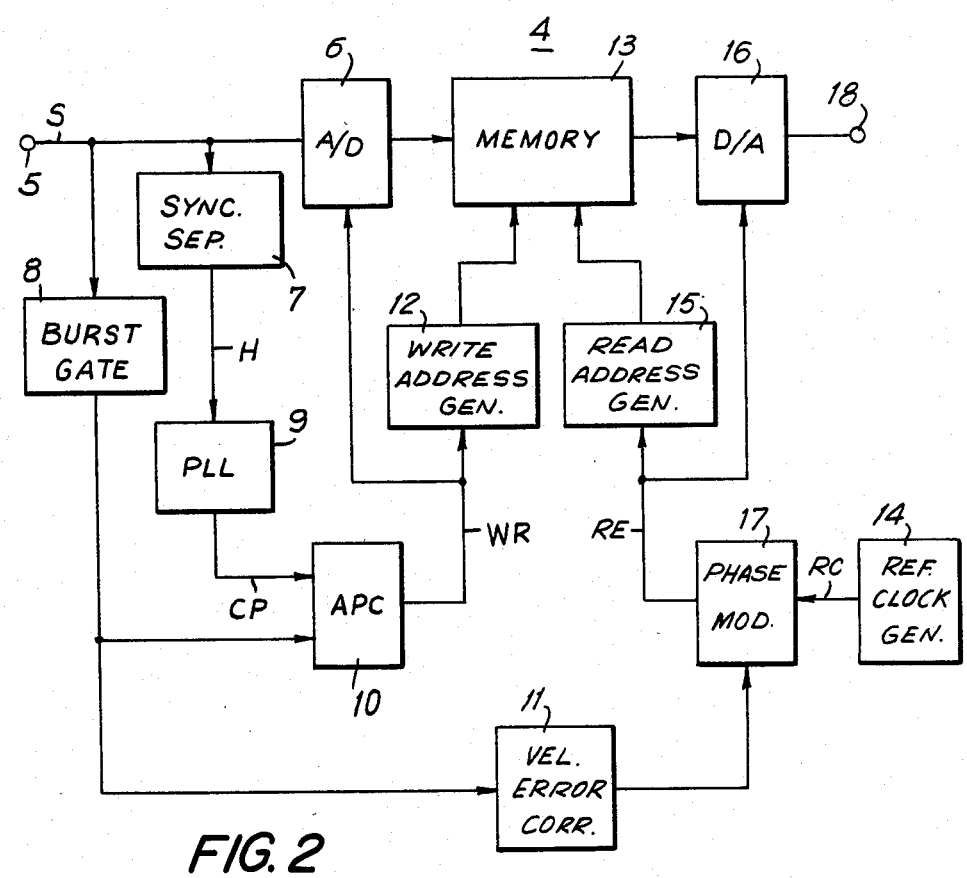
FIG. 2 is a block diagram of a prior art time base corrector.

In a conventional time base corrector 4 illustrated in FIG. 2, a reproduced video signal S including time base fluctuations is applied at input terminal 5 and is supplied therefrom to an analog-to-digital (A/D) converter 6, a synchronizing signal separator 7 and a burst gate 8. Synchronizing signal separator 7 separates the horizontal synchronizing signal H from the video signal S and supplies it to a phase locked loop (PLL) circuit 9. PLL circuit 9 conventionally includes a voltage controlled oscillator (VCO), a phase comparator and a low pass filter (not illustrated) and produces a high frequency clock pulse CP having a frequency which is a multiple, for example four times, the subcarrier frequency fsc in the reproduced video signal S and which includes the time base fluctuations therein. The output clock pulse CP from PLL circuit 9 is supplied to an automatic phase control (APC) circuit 10. Burst gate 8 separates the color burst signal from the reproduced video signal S and supplies it to both APC circuit 10 and a velocity error corrector 11. APC circuit 10 is responsive to the separated color burst signal to control the phase of clock pulse signal CP to bring the two signals into phase. The output, which is a phase controlled clock signal including the time base fluctuations of the input video signal S, is supplied as a write clock signal WR to a write address generator 12 and to A/D converter 6.

A/D converter 6 digitizes video signal S and supplies the digitized video signal to a memory 13 at times determined by write clock signal WR. Address generator 12 is also responsive to write clock signal WR to generate write addresses within the storage area of memory 13 at which the digitized video signal is to be successively stored. The write addresses are produced by write address generator 12 at times determined by write clock signal WR. A reference clock generator 14, for example an oscillator, produces a reference clock signal RC having a known, stable frequency, in the present example 4 fsc. If velocity error corrector 11 were not present in this prior art time base corrector 4, reference clock signal RC could be supplied directly to a read address generator 15 and to a digital-to-analog (D/A) converter 16 as a read clock signal RE. In the illustrated time base corrector 4, however, reference clock signal RC is supplied to a phase modulator 17. Velocity error corrector 11 calculates a velocity error correction signal from the phase variations of the burst signal supplied from burst gate 8 and stores the same, and at an appropriate later time supplies this velocity error correction signal to phase modulator 17 which then modulates the phase of reference clock signal RC to include in the read clock signal RE the same phase variations as the color burst signal. The phase variations of the burst signal reflect the high frequency fluctuations in the time base of the reproduced video signal.

Read address generator 15 generates read addresses in a manner corresponding to the write addresses generated by write address generator 12 and supplies the same to memory 13 for reading out the stored digitized video signal at the identified read addresses. D/A converter 16 then reconverts the digitized video signal back into an analog video signal and supplies it to output terminal 18.

Thus, the analog video signal at output terminal 18 is produced without either low frequency time base fluctuations, removed by the use of PLL circuit 9 and APC circuit 10, or high frequency velocity fluctuations, removed by velocity error corrector 11 and phase modulator 17.

However, as mentioned above, velocity error corrector 11 is a complex and expensive device, and it would be a distinct advantage to be able to eliminate it from the video tape recorder, so as to reduce the manufacturing cost and hence the price, while retaining its function in removing high frequency time base fluctuations. However, when velocity error corrector 11 and phase modulator 17 are removed, so that reference clock signal RC is used as read address signal RE, only the low frequency fluctuations are removed from the input video signal S. This is because the low pass filter in PLL circuit 9 has a predetermined time constant $t_{LPF}$ which is equivalent to the period of about a 10 Hz signal. Thus, when a rapid time base fluctuation occurs, such as the one illustrated in FIG. 1, it will eventually be corrected, but it requires a decay period equal to the time constant $t_{LPF}$ in order to effectively return the display to its normal condition. Therefore, the suddenly occurring or high frequency time base fluctuations cannot be corrected in time to prevent a detectable image thereof from appearing on the television screen, as at $3a$ on FIG. 1.

Figure 3:
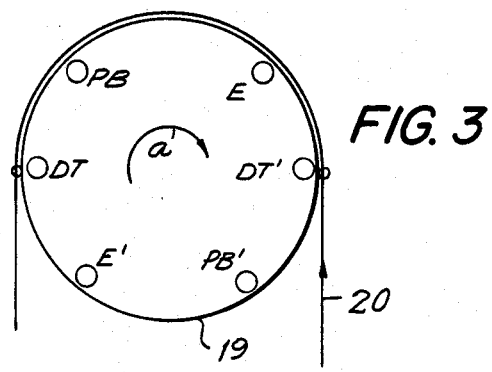
FIG. 3 is a schematic illustration of the rotary drum and associated transducing heads of a multiple head video tape recorder.

The present invention is directed toward removing certain types of high frequency time base fluctuations without requiring a complex and expensive velocity error corrector. More specifically, the present invention is directed toward removing those high frequency time base fluctuations which are repetitive, and which preferably repeat with a period of the frame frequency of the reproduced video signal and multiples thereof. Such repetitive high frequency time base fluctuations may be caused, for example, by impact waves in a multiple head video tape recorder (VTR). As is well known in such VTRs, the video signal is recorded on magnetic tape in a series of successive slant tracks, each including one field of the video signal. The video signal is reproduced therefrom by successive scans of a playback head PB (FIG. 3) mounted on a rotary drum 19 about which the magnetic tape 20 is wrapped. As illustrated schematically in FIG. 3, rotary drum 19 may carry many heads, including, in the illustrated example, two regular playback heads PB, PB', dynamic tracking heads DT, DT' each mounted on a deflectable support such as a bimorph leaf, and erasing heads E, E'. Rotary drum 19 is shown to rotate clockwise in the direction of arrow a in the example of FIG. 3, while magnetic tape 20 is transported in a counter-clockwise direction around and at a slant angle to rotary drum 19 so that the above-identified heads successively come into contact with magnetic tape 20 and trace along respective slant tracks thereon. Magnetic tape 20 is held closely to rotary drum 19 along a predetermined portion of its periphery by lead-in and lead-out tape guides 21. As shown in FIG. 3, when playback head PB is at an intermediate point in tracing a slant track, dynamic tracking head DT, which projects slightly from the peripheral surface of drum 19, comes into contact with tape 20. The resulting physical impact causes an impact wave in tape 20, as illustrated schematically in FIG. 4, by applying a force to tape 20 in the radially outward direction and which is equivalently represented by the arrow b. A similar impact wave is generated in tape 20 when the next erasing head E' comes into contact with the tape.

Figure 4:
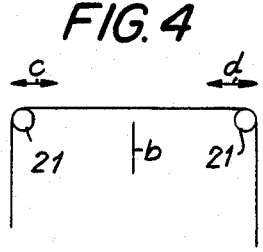
FIG. 4 is a schematic illustration of the generation of tape vibration in the apparatus of FIG. 3.
Figure 5:
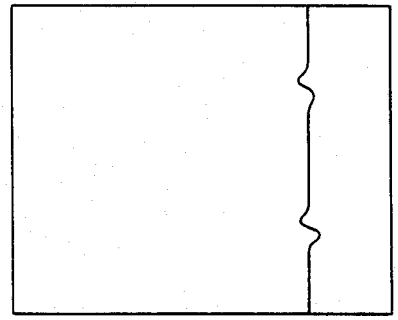
FIG. 5 is a schematic diagram of a television screen illustrating the effect on a displayed image of the impact wave generated by the apparatus of FIG. 3.

Since tape guides 21 hold magnetic tape 20 relatively taut about the periphery of rotary drum 19, the effect of the force applied in the direction of arrow b in FIG. 4 is to cause vibrations in tape 20 parallel to its surface in the directions of arrows c and d, causing magnetic tape 20 to shrink and stretch and thereby provide high frequency time base fluctuations, with the result that wiggles appear in black or white vertical lines of the displayed image, as shown at $\omega_1$ and $\omega_2$ on FIG. 5. Since dynamic tracking head DT is spaced from playback head PB by substantially the same angular distance that dynamic tracking head DT' is spaced from playback head PB', the impact of the dynamic tracking head DT or DT' occurs at approximately the same time during each field period of the video signal as it is reproduced, causing approximately the same high frequency time base fluctuations during successive fields. Since erasing head E' is angularly spaced from head DT by approximately the same angular distance as erasing head E follows head DT', it will be apparent that the high frequency time base fluctuations due to the impacts of erasing head E' and E also occur at approximately the same times in successive fields of the reproduced video signal. Of course, the impacts due to heads DT and E' during the reproducing of one field by head PB and the impacts due to heads DT' and E during reproducing of the other field by head PB' occur at precisely the same times in successive frames.

Figure 6:
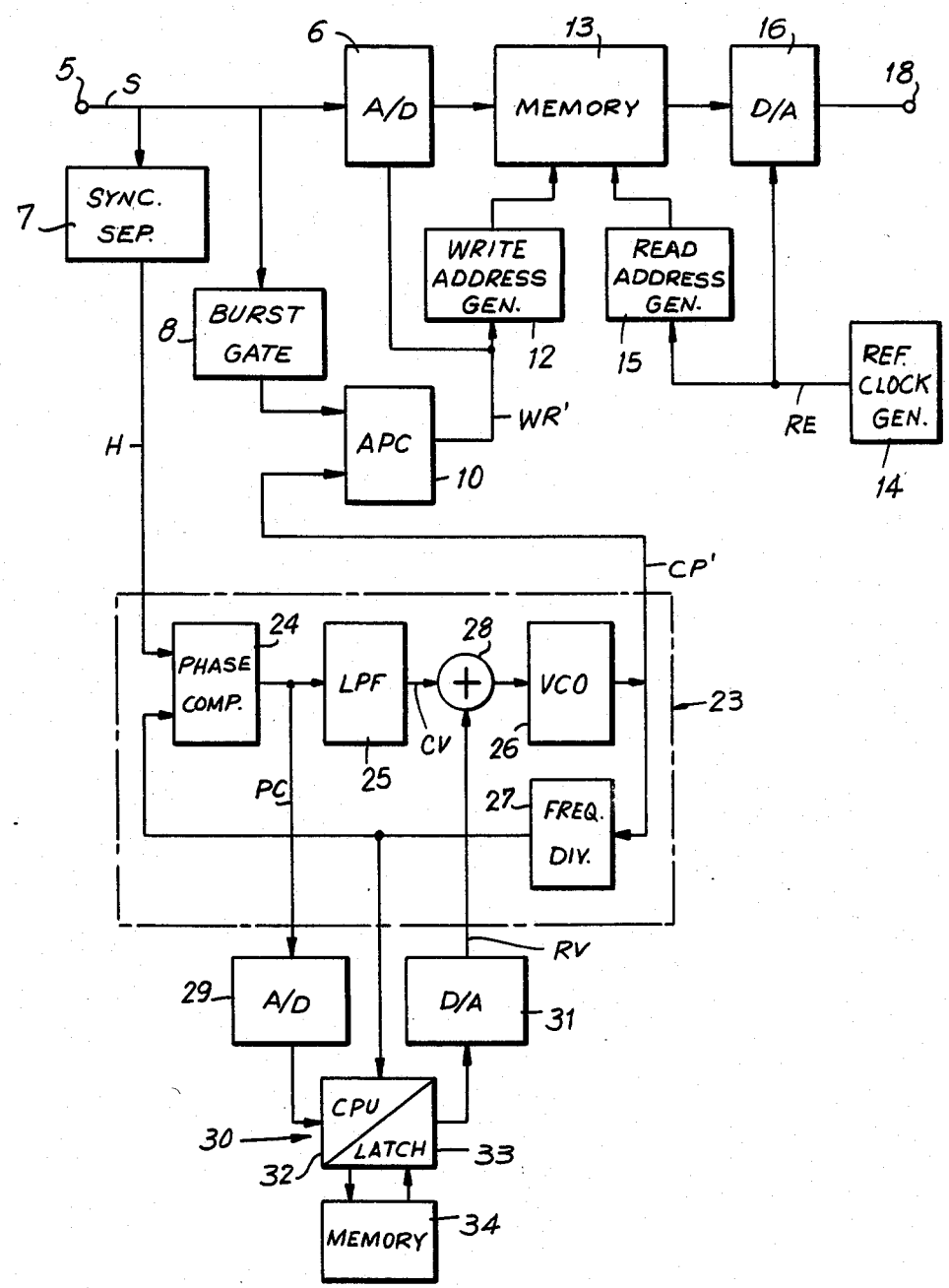
FIG. 6 is a block diagram of a time base corrector according to an embodiment of the present invention.

A time base corrector 22 in accordance with an embodiment of the present invention is shown on FIG. 6 and is specifically designed to remove such high frequency time base fluctuations which repeat from frame to frame in the reproduced video signal. The time base corrector 22 is shown to include many of the elements described with reference to the prior art time base corrector 4 of FIG. 2, and those elements in time base corrector 22 are identified by the same reference numerals. Thus, in time base corrector 22 the reproduced video signal S received at input terminal 5 is supplied to A/D converter 6, horizontal synchronizing signal separator 7 and burst gate 8. The output of burst gate 8 is supplied to APC circuit 10, the output of which is supplied to write address generator 12 as the write clock signal WR' which differs from prior art write clock signal WR as described below. Write clock signal WR' is also supplied to A/D converter 6 so that the video signal S is digitized and written into memory 13 at times determined in accordance with write clock signal WR' and retains the time base fluctuations occurring therein as reproduced. In the time base corrector 22, reference clock generator 14 supplies its output clock as the read clock signal RE to read address generator 15 and to D/A converter 16 for reading out the digitized video signal from memory 13 at times determined in accordance therewith, and in particular at regular, predefined intervals containing no time base fluctuations.

Time base corrector 22 includes a PLL circuit 23 in place of the PLL circuit 9 of prior art time base corrector 4. While the purpose of PLL circuit 23 is the same as PLL circuit 9, that is, to output a high frequency clock signal CP', for example at 4 fsc, to be supplied to APC circuit 10 wherein it is brought into phase agreement with the burst signal from burst gate 8 and output as the write clock signal WR', PLL circuit 23 in the time base corrector 22 embodying this invention is adapted to compensate its output signal CP' for the repetitive high frequency time base fluctuations which are correctable in time base corrector 4 only by the addition thereto of velocity error corrector 11 and phase modulator 17.

In accordance with known principles, PLL circuit 23 includes a phase comparator 24, a low pass filter 25, a voltage controlled oscillator (VCO) 26 and a frequency divider 27. VCO 26 is adapted to output its high frequency clock signal CP' in a frequency band centered around 4 fsc. The output clock signal CP' of VCO 26 is supplied to frequency divider 27, wherein it is divided to be comparable to the frequency of the horizontal synchronizing signal H of the reproduced video signal S, and these two signals are supplied to phase comparator 24. The phase compared output PC of phase comparator 24, indicative of the agreement or disagreement of phase between the two signals, is supplied to low pass filter 25 which provides an output voltage CV to an adder 28 having its output connected, as a control voltage, to VCO 26, which is controlled thereby to modify its output signal CP' to reflect the difference in phase between the horizontal synchronizing signal H and the divided output of VCO 26 so as to reduce the difference therebetween. The operation of PLL circuit 23, to the extent described above, is generally in accordance with conventional PLL operating principles, for example, as employed in PLL circuit 9 used in time base corrector 4.

However, in accordance with the present invention, VCO 26 is further controlled by a residual control voltage RV added in adder 28 to the conventional control voltage CV from low pass filter 25 and adapted to compensate for the repetitive high frequency time base fluctuations such as impact error fluctuations. More specifically, in accordance with this invention, the output PC of phase comparator 23 is also supplied to an A/D converter 29, wherein it is digitized and then supplied to a control circuit 30 which is hereinafter described in detail. A/D converter 29 digitizes the phase compared output PC (phase error) from phase comparator 24 so that its output constitutes phase error data in respect to the portion of the video signal currently being reproduced. The output of control circuit 30 is supplied to a D/A converter 31, wherein it is converted into an analog signal and supplied as the residual control voltage RV to adder 28.

Control circuit 30 advantageously is generally comprised of a central processing unit (CPU) 32 and a latch circuit 33. Control circuit 30 also receives the divided output from frequency divider 27 as a timing signal so that it performs its operations at times reflecting the low frequency time base fluctuations of the reproduced video signal. Therefore, the output of D/A converter 31, that is, residual control voltage RV, reflects the low frequency time base fluctuations to the same extent as control voltage CV from low pass filter 25 in order that the two control voltages RV, CV applied to adder 28 will be properly in phase with each other. Residual control voltage RV further compensates for the repetitive high frequency time base fluctuations as will now be described.

Figure 7:
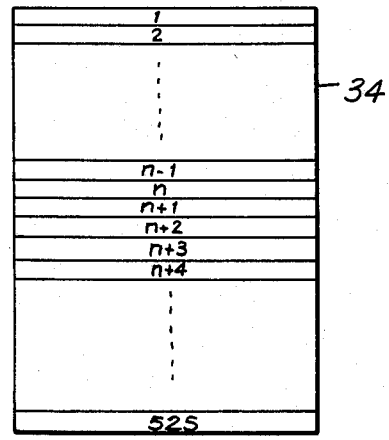
FIG. 7 is a diagram of a memory included in the time base corrector of FIG. 6.

Connected to control circuit 30 is a memory 34 adapted to store residual phase error data to be used in combination with the phase error data supplied from A/D converter 29 to provide the residual control voltage RV. As shown in FIG. 7, memory 34 includes a number of addresses equal to the number of horizontal lines within each frame of the video signal S being reproduced. For example, in a time base corrector adapted for the NTSC system used in the United States and which employs 525 lines per frame, memory 34 has 525 separate addresses for storing residual phase error data separately for each of the lines. In accordance with the present invention, when control circuit 30 receives the phase error data for one line of a frame currently being reproduced, it reads from memory 34 residual phase error data previously calculated for the same line in the frame next previous to the frame currently being reproduced, that is, the frame produced during the previous revolution of rotary drum 19. The residual phase error data generated in the preceding frame for each line is used in the present frame for the corresponding line by being supplied to D/A converter 31 and output therefrom as the residual control voltage RV to adder 28 to be added to the control voltage CV from low pass filter 25 at a time when control voltage CV corresponds also to the corresponding line.

In accordance with the present invention, the frequency of signal CP' from VCO 26 during the nth line is determined by the phase error signal appearing in the (n+1)st line in order to ensure that control voltage CV and residual control voltage RV both correspond to the same line within the frame of video signal S. To understand this point, reference should be made to FIGS. 8A, 8B and 8C, which are timing diagrams respectively illustrating the separated horizontal synchronizing signal H, the output CP' from VCO 26 and the phase comparison output PC of phase comparator 24.

FIGS. 8A, 8B and 8C are designed to illustrate the effect of the phase difference between the reproduced horizontal synchronizing signal H and the VCO output CP' on the phase comparator output PC and are not intended to represent values of these signals during a particular operation of time base corrector 22. For ease of understanding, the pulses of horizontal synchronizing signal H in FIG. 8A are illustrated as occurring at regular intervals, although it will be understood that it is the irregular occurrence of the horizontal synchronizing pulses for which time base corrector 22 compensates. Similarly, the first pulse of signal CP' which should be coincident with the horizontal synchronizing pulse for each line is emphasized, with three successive pulses being illustrated to indicate that signal CP' is a high frequency clock signal. As shown in FIG. 8A, the horizontal synchronizing pulse H of the (n−1)st horizontal line period properly occurs at the start of this line period, and so thus corresponding VCO output signal CP' (FIG. 8B) also occurs at the start of the line period and phase comparator output PC (FIG. 8C) is zero. However, over the course of the (n−1)st line period an advance develops within the reproduced video signal S so that the next occurring horizontal synchronizing pulse for the nth line period occurs slightly before the corresponding pulse in signal CP'. As a result phase comparator output PC takes a value slightly greater than zero. It is assumed that the advance grows during this nth line period so that the next horizontal synchronizing pulse arrives still further ahead of the corresponding pulse of signal CP', so that phase comparator output PC rises further. In the (n+2)nd horizontal line, the advance has been reduced slightly and phase comparator output PC falls, while at the start of the (n+3)rd line period the horizontal synchronizing pulse now follows the corresponding pulse in the signal CP', so that the value of phase comparator output PC becomes negative. For proper compensation, of course, the relative delay or advance between the horizontal synchronizing signal H and VCO output signal CP' should not be permitted to develop or grow. Therefore, it is advantageous that the phase comparator output PC developed during the nth horizontal line period and reflecting the accumulated delay during the (n−1)st horizontal line period should be available at the start of the nth horizontal line period so as to correct VCO output signal CP' immediately. However, by reason of the processing time required in PLL circuit 23 for VCO output signal CP' to be divided, phase compared and filtered, phase comparator output PC is not immediately available but is available only during the next succeeding horizontal line period. Of course, it is theoretically impossible to control VCO 26 during the (n−1)st line in response to a control signal generated during the nth line. The prior art time base corrector 4 of necessity had a time constant in its low pass filter $t_{LPF}$ longer than several horizontal line periods and therefore this slight delay in correction was not separately noticeable. However, in accordance with the present invention, compensation for repetitive high frequency time base fluctuations is provided with compensation at each horizontal line period. Therefore, in accordance with the present invention, the nth line of the reproduced video signal in one particular frame is compensated for by residual phase error data computed from the nth line of the preceding frame and read out from memory 34 during the (n−1)st horizontal line of the current frame so as to be present as residual control voltage RV during the nth line thereof.

The process is as follows. Memory 34 has stored therein residual phase error data calculated for each of the horizontal lines in the next previous frame. At the (n−1)st line of the next or present frame, control circuit 30 reads the residual phase error data stored at address n of memory 34. This residual phase error data from address n is supplied to D/A converter 31, wherein it is reconverted to an analog signal and supplied to adder 28 as residual control voltage RV so as to be added to the control voltage CV from low pass filter 24 for causing VCO 26 to follow the variations in the time base occurring during the nth horizontal line of the present field. During the (n+1)st horizontal period or line of the present frame, the phase comparator output PC corresponding to the nth line just processed by phase comparator 24 is converted in A/D converter 29 to digital form and supplied to control circuit 30. Control circuit 30 uses latch circuit 33 for latching the digitized phase comparator output during this (n+1)st horizontal period.

During the (n+2)nd line, the data stored at address n of memory 34 and corresponding to the nth horizontal line is again read by control circuit 30. During the (n+3)rd line, this read out data and the latched data from latch circuit 33 are combined to provide new residual phase error data indicative of the high frequency component of the time base fluctuations. More particularly, in the described embodiment, the latched data is added to the read out residual phase error data in the ratio 31/32. Of course, the ratio in which these two signals are combined, that is, the 31/32 ratio, is selected in accordance with the operating parameters of the particular time base corrector 22 so as to provide the most advantageous results in each case. Finally, during the (n+4)th line the calculated new residual phase error data is written into memory 34 at address n in place of the previously stored residual phase error data therein and therefore is available for read out during the (n−1)st line of the next succeeding frame.

This calculation of new residual phase error data is illustrated schematically in the flowchart of FIG. 9. As shown therein, in the first step (101) the phase compared output PC for the nth horizontal line of the mth frame, and which is designated as $\phi_{nm}$, is measured. In the next step (102), the averaged phase compared output $\phi\Sigma nm$ for the nth line of the mth frame is calculated to be equal to $\phi_{nm}+31/32[\phi\Sigma nm-1]$. That is, the averaged phase compared output equals the measured phase error for the present line and frame plus 31/32 times the residual phase error for the same line in the previous frame. Lastly, in the step (103) the new residual phase error data is stored for reading at the (n−1)st line for the present frame so as to be available in the next succeeding frame as residual phase error data.

The operation of control circuit 30 may alternatively be understood from cnosideration of the equivalent circuit thereof illustrated in FIG. 10. As shown therein, the output of A/D converter 29 is supplied through an input terminal 35 and an adder 36 to a one frame delay 37. The frame delayed signal output from delay 37 is supplied through a horizontal line delay 38 and then to a multiplier 39, which multiplies the received signal by 31/32. The multiplied signal is supplied from multiplier 39 as a second input to adder 36, and the residual phase error data is derived from frame delay 37 at an output terminal 40 to which D/A converter 31 is to be connected.

In accordance with the present invention, a time base corrector is effective to remove both low frequency time base fluctuations and repetitive or periodic high frequency time base fluctuations which repeat at the frame period or at a multiple thereof. Due to the repetitious nature of the reproduction process in conventional video tape recorders, it is quite likely that a majority of the high frequency time base fluctuations will repeat with the frame frequency of the video signal as the successive slant tracks each containing one field are successively scanned. Therefore, the present invention provides an apparatus and method for removing such repetitive high frequency time base fluctuations without requiring the use of a complicated and expensive velocity error corrector.

Although a preferred embodiment of the present invention has been described in detail with reference to the drawings, it will be apparent that the invention is not limited to that precise embodiment, and that many modifications and variations could be effected therein by one skilled in the art without departing from the spirit or scope of the invention as defined by the appended claims.

I claim:

1. A time base corrector for correcting time base fluctuations in a video signal containing a horizontal synchronizing signal and being reproduced from a recording medium, comprising:
   a write clock generator for generating a write clock signal having said time base fluctuations of the reproduced video signal;
   a memory unit for storing the reproduced video signal in response to the write clock signal; and
   a read clock generator for generating a read clock signal supplied to said memory unit to read the stored reproduced video signal from said memory unit, characterized in that said write clock generator comprises:
   voltage controlled oscillator means for generating an oscillating output signal;
   frequency divider means for frequency dividing said oscillating output signal to provide a frequency divided output;
   phase comparator means for comparing phases of said frequency divided output and said horizontal synchronizing signal of said reproduced video signal to provide a comparison output;
   low pass filter means for filtering said comparison output to provide a filtered output;
   analog-to-digital converter means for converting said comparison output to digital data;
   memory means having a plurality of addresses for storing residual phase error data;
   control means supplied with the converted digital data for mixing, in a predetermined ratio, said converted digital data and corresponding residual phase error data read from a selected one of said addresses in said memory means to generate new residual phase error data and to store said new residual phase error data at said selected address;

digital-to-analog converter means for converting said residual phase error data read out from said selected address in said memory means to an analog control voltage; and adder means for adding together said filtered output of said low pass filter means and said analog control voltage to form a voltage control signal for controlling said voltage controlled oscillator means.

2. A time base corrector according to claim 1, wherein said control means is supplied with said divided output of said frequency divider means and is responsive thereto to change said selected address at times determined thereby.

3. A time base corrector according to claim 1, wherein said control means includes central processing unit means.

4. A time base corrector according to claim 1, wherein said predetermined ratio in which said converted digital data and said residual phase error data are mixed is 31:32.

5. A time base corrector according to claim 1, wherein each of said plurality of addresses of said memory means corresponds to one respective line within a frame of said reproduced video signal, and said address selected by said control means during one line corresponds to the line preceding said one line.

6. A time base corrector according to claim 5, wherein said control means includes latch means for latching the converted digital data from said analog-to-digital converter means corresponding to the current line of said reproduced video signal, said memory means provides said residual phase error data stored in the address corresponding to said current line one line duration after said latching of said converted digital data, said control means mixes the latched data and the read out data in said predetermined ratio two line durations after said latching of said converted digital data, and the mixed data is stored in said memory means at said address corresponding to said current line three line durations after said latching of said converted digital data.

7. A time base corrector according to claim 5, wherein said residual phase error data from said memory means for addition to the converted digital data of an (n−1)st line of one of said frames of said reproduced video signal is read from an address corresponding to an nth line of a frame.

8. A time base corrector according to claim 7, wherein said residual error data read during said (n−1)st line of said one frame from said address corresponding to the nth line of a frame was generated as said new residual phase error data from the converted digital data corresponding to the nth line of the frame of said reproduced video signal previous to said one frame.

9. A time base corrector according to claim 8, wherein, after said residual phase error data corresponding to the nth line of the previous frame is read out during the (n−1)st line of the one frame, the read out residual phase error data is supplied to said adder means and said voltage control signal is produced thereby and supplied to said voltage controlled oscillator means during the nth line of said one frame.

10. A time base corrector according to claim 9, wherein said control means includes latch means and, during the (n+1)st line of said one frame, said analog-to-digital converter means converts the comparison output for the nth line of said one frame to said converted digital data and said control means latches said converted digital data in said latch means;

during the (n+2)nd line of said one frame, said control means again reads out from said memory means the residual phase error data stored at said address corresponding to the nth line of a frame;

during the (n+3)rd line of said one frame, said control means mixes this residual phase error data with the latched converted digital data in said predetermined ratio to constitute said new residual phase error data; and during the (n+4)th line of said one frame, said control means stores said new residual phase error data at said address corresponding to the nth line, whereby it is available as residual phase error data during the (n−1)st line of the next following frame of said reproduced video signal.

11. A method for correcting time base fluctuations in a video signal containing a horizontal synchronizing signal and being reproduced from a recording medium, said method comprising the steps of:

generating a write clock signal having said time base fluctuations of the reproduced video signal;

storing the reproduced video signal in response to the write clock signal; and generating a read clock signal for reading out the stored reproduced video signal, said method characterized in that said step of generating said write clock signal comprises:

generating a voltage controlled oscillating output signal;

frequency dividing said oscillating output signal to provide a frequency divided output;

comparing a phase of said frequency divided output with a phase of said horizontal synchronizing signal of said reproduced video signal to provide a comparison output;

low pass filtering said comparison output to provide a filtered output;

converting said comparison output to digital data;

storing residual phase error data at a plurality of addresses;

converting residual phase error data read out from a selected one of said addresses to an analog control voltage;

mixing in a predetermined ratio said converted digital data and corresponding residual phase error data from the selected address to generate new residual phase error data;

storing said new residual phase error data in the selected address; and adding together said filtered output and said analog control voltage to form a voltage control signal to control the generation of said oscillating output signal.

12. A method according to claim 11, wherein each said address corresponds to one respective line within a frame of said reproduced video signal, and said residual phase error data corresponding to one of said lines and stored at the respective address is read out during the line preceding said one line.

13. A method for correcting time base errors according to claim 12, wherein said residual phase error data for mixing with the converted digital data of an (n−1)st line of a frame of said reproduced video signal is read from an address corresponding to an nth line of a frame.

14. A method according to claim 13, wherein said residual phase error data read during said (n−1)st line of said one frame from said address corresponding to the nth line of a frame was generated as said new residual phase error data from the converted digital data corresponding to the nth line of the frame of the reproduced video signal previous to said one frame.

15. A method according to claim 14, wherein, after reading out said residual phase error data corresponding to the nth line of the previous frame during the (n−1)st line of the one frame for mixing with the converted digital data, the voltage control signal produced thereby is supplied for controlling said generation of said oscillating output signal during the nth line of said one frame.

16. A method according to claim 15, wherein said mixing and storing of the residual phase error data include the steps of:

during the (n+1)st line of said one frame, converting said comparison output corresponding to the nth line of said one frame to said converted digital data;

during the (n+2)nd line of said one frame, rereading the residual phase error data stored at said address corresponding to the nth line of a frame;

during the (n+3)rd line of said one frame, adding the reread residual phase error data to the just converted digital data in said predetermined ratio to constitute said new residual phase error data; and during the (n+4)th line of said one frame, storing said new residual phase error data at said address corresponding to the nth line, whereby it is available as residual error data during the (n−1)st line of the next following frame of said reproduced video signal.

* * * * *